US012591521B2

(12) United States Patent
Kwok et al.

(10) Patent No.: US 12,591,521 B2
(45) Date of Patent: Mar. 31, 2026

(54) DRAM LAYOUT FOR LOGICAL-TO-PHYSICAL (L2P) ADDRESS INDIRECTION TABLE (AIT)

(71) Applicant: SK Hynix NAND Product Solutions Corp., Rancho Cordova, CA (US)

(72) Inventors: Zion Kwok, Burnaby (CA); Steven Williams, Rancho Cordova, CA (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 18/666,630

(22) Filed: May 16, 2024

(65) Prior Publication Data

US 2025/0355811 A1     Nov. 20, 2025

(51) Int. Cl.
*G06F 12/02* (2006.01)
*G06F 12/1045* (2016.01)

(52) U.S. Cl.
CPC ...... *G06F 12/1054* (2013.01); *G06F 12/0292* (2013.01)

(58) Field of Classification Search
CPC ........................ G06F 12/1054; G06F 12/0292
USPC ........................................................ 711/206
See application file for complete search history.

(56) References Cited

U.S. PATENT DOCUMENTS

| | | | |
|---|---|---|---|
| 8,352,707 B2 | 1/2013 | Hall | |
| 11,263,147 B2 | 3/2022 | Miura | |
| 11,550,658 B1 * | 1/2023 | Walsh | G06F 12/0246 |
| 2017/0364446 A1 | 12/2017 | Pham et al. | |
| 2018/0018100 A1 | 1/2018 | Aho et al. | |
| 2021/0097004 A1 | 4/2021 | Nagarajan et al. | |
| 2022/0058135 A1 * | 2/2022 | Luo | G06F 11/1068 |
| 2022/0075732 A1 * | 3/2022 | Palmer | G06F 12/0292 |
| 2024/0095165 A1 * | 3/2024 | Benisty | G06F 12/0246 |
| 2024/0345949 A1 * | 10/2024 | Liu | G06F 12/0871 |

OTHER PUBLICATIONS

SK Hynix NAND Product Solutions Corp. (dba Solidigm), PCT/US2025/028953, International Search Report and Written Opinion, Sep. 11, 2025. 9 pgs.

* cited by examiner

*Primary Examiner* — Gautam Sain
*Assistant Examiner* — Wei Ma
(74) *Attorney, Agent, or Firm* — Morgan, Lewis & Bockius LLP

(57) ABSTRACT

This application is directed to compressing a logical-to-physical address indirection table in a memory system of an electronic device. The electronic device identifies an address block including a plurality of physical addresses that corresponds to an ordered sequence of logical addresses. Each logical address corresponds to a distinct physical address. The electronic device further determines that a first physical address is associated with a first word having a first word location in the address block, and extracts the first word from the first word location in the address block. Based on the first word location, the electronic device determines a first bit location in a supplemental word that is distinct from the first word. The electronic device extracts at least a first bit from the first bit location of the supplemental word, and generates the first physical address based on the first word and the first bit.

20 Claims, 6 Drawing Sheets

204A, 204B, and 204N: collectively 204
206A and 206B: collectively 206
214A, 214B, and 214N: collectively 214
216A, 216B, and 216N: collectively 216

_600_

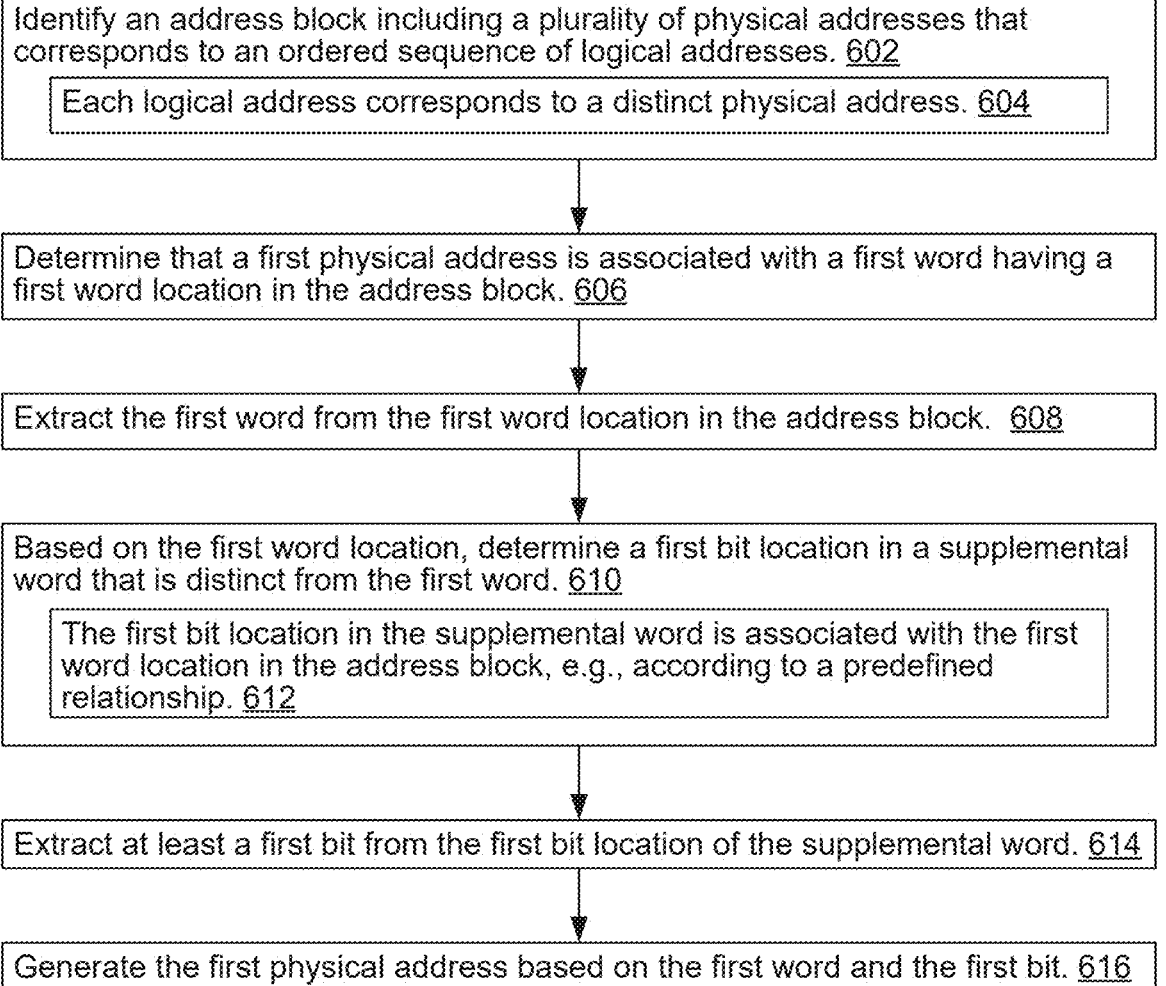

Identify an address block including a plurality of physical addresses that corresponds to an ordered sequence of logical addresses. 602

Each logical address corresponds to a distinct physical address. 604

Determine that a first physical address is associated with a first word having a first word location in the address block. 606

Extract the first word from the first word location in the address block. 608

Based on the first word location, determine a first bit location in a supplemental word that is distinct from the first word. 610

The first bit location in the supplemental word is associated with the first word location in the address block, e.g., according to a predefined relationship. 612

Extract at least a first bit from the first bit location of the supplemental word. 614

Generate the first physical address based on the first word and the first bit. 616

Figure 6

DRAM LAYOUT FOR LOGICAL-TO-PHYSICAL (L2P) ADDRESS INDIRECTION TABLE (AIT)

TECHNICAL FIELD

This application relates generally to memory management including, but not limited to, methods, systems, and non-transitory computer-readable media for compressing address data in a logical-to-physical (L2P) indirection table of a memory system (e.g., solid-state drive).

BACKGROUND

Memory is applied in a computer system to store instructions and data. The data are processed by one or more processors of the computer system according to the instructions stored in the memory. Multiple memory units are used in different portions of the computer system to serve different functions. Specifically, the computer system includes non-volatile memory that acts as secondary memory to keep data stored thereon if the computer system is decoupled from a power source. Examples of the secondary memory include, but are not limited to, hard disk drives (HDDs) and solid-state drives (SSDs). An SSD typically has an address indirection table that maps logical addresses associated with a host device to physical addresses of NAND flash memory in the SSD. Each memory unit of the SSD needs to be addressable in the address indirection table. Memory units can be grouped into larger block sizes and addressed with fewer addresses. However, as a capacity of the SSD increases, its memory units are addressed with more physical addresses, and more bits are inevitably needed to represent each physical address of the SSD. Long physical addresses require a large storage space for the address indirection table. More importantly, excessively long addresses cannot be accessed within a burst length (e.g., 64 bytes), thereby demanding excessive power and access time overheads during the course of reading from or writing into memory units in the SSD. It would be beneficial to efficiently pack physical addresses stored in an address indirection table of an SSD to both conserve the storage space of the table and enhance memory access performance.

SUMMARY

Various embodiments of this application are directed to methods, systems, devices, non-transitory computer-readable media for compressing address data stored in a logical-to-physical address indirection table (AIT). A physical address of a memory system has a limited range determined based on a capacity of the memory system. Logical addresses are mapped to physical addresses in the AIT, and the AIT is stored in a cache, a DRAM, or a non-volatile memory (e.g., a NAND flash memory). This invention optimizes a data layout for the AIT. Each physical address has a number of bits to represent a respective unique physical address location in the non-volatile memory (e.g., an SSD). As a capacity of the non-volatile memory increases, a number of physical address locations increases, and more bits are needed to store each and every physical address in the non-volatile memory. In some implementations, each physical address is represented by an N-bit physical address entry, where N is greater than 32. For example, thirty-one 33-bit physical address entries are stored in a physical address block having 128 bytes that spans two 64-byte DRAM accesses and two processor cache lines. Some implementations of this application is directed to reconfiguring the AIT (e.g., made of 32-bit address words) to accommodate N-bit (e.g., N>32) physical address entries efficiently without wasting DRAM space, while allowing these physical address entries to be accessed conveniently.

In one aspect, a method is implemented at an electronic device to efficiently store an L2P address indirection table on a memory system (e.g., solid-state drives). The method includes identifying an address block including a plurality of physical addresses that corresponds to an ordered sequence of logical addresses. Each logical address corresponds to a distinct physical address. The method further includes determining that a first physical address is associated with a first word having a first word location in the address block, and extracting the first word from the first word location in the address block. The method further includes, based on the first word location, determining a first bit location in a supplemental word that is distinct from the first word. The first bit location in the supplemental word is associated with the first word location in the address block. The method further includes extracting at least a first bit from the first bit location of the supplemental word and generating the first physical address based on the first word and the first bit.

In another aspect, some implementations include an electronic device that includes one or more processors and memory having instructions stored thereon, which when executed by the one or more processors cause the processors to perform any of the above methods to efficiently pack an L2P address indirection table on a memory system (e.g., solid-state drives).

In yet another aspect, some implementations include a non-transitory computer readable storage medium storing one or more programs. The one or more programs include instructions, which when executed by one or more processors cause the processors to implement any of the above methods to efficiently pack an L2P address indirection table on a memory system (e.g., solid-state drives).

In accordance with some embodiments of this application, thirty-one 33-bit physical address entries are stored in a physical address block having 128 bytes. Each of thirty physical address entries are stored within a respective half of the physical address block, and only a remaining physical address entry that is distinct from the thirty physical address entries and spans two halves of the physical address block. Each of the thirty physical address entries has 33 bits, which further includes 32 bits stored in a respective 32-bit address word and a remaining bit stored in a supplemental address word. Both the respective address word and the supplemental address word are located within the same half of the physical address block, allowing the respective one of the thirty physical address entries to be conveniently obtained via consistent memory operations (e.g., bit shifting). Each half of the physical address block has a single supplemental address word, and the fifteen physical address entries share the supplemental address word and stores the remaining bit of each of the fifteen physical address entries therein. Two supplemental address words of the two halves of the physical address block store the remaining physical address entry jointly. As such, each of the thirty physical address entries may be accessed with a single 64-byte DRAM access and a single processor cache line, while only the remaining physical address entry may be accessed with two 64-byte DRAM accesses and two processor cache lines. This simplifies firmware programs to a small number of operations to read a 33-bit physical address entry and helps the memory device to attain high performance.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 6 is a flow diagram of a method for compressing addresses stored in an L2P address indirection table, in accordance with some embodiments.

Like reference numerals refer to corresponding parts throughout the several views of the drawings.

DETAILED DESCRIPTION

Figure 1:
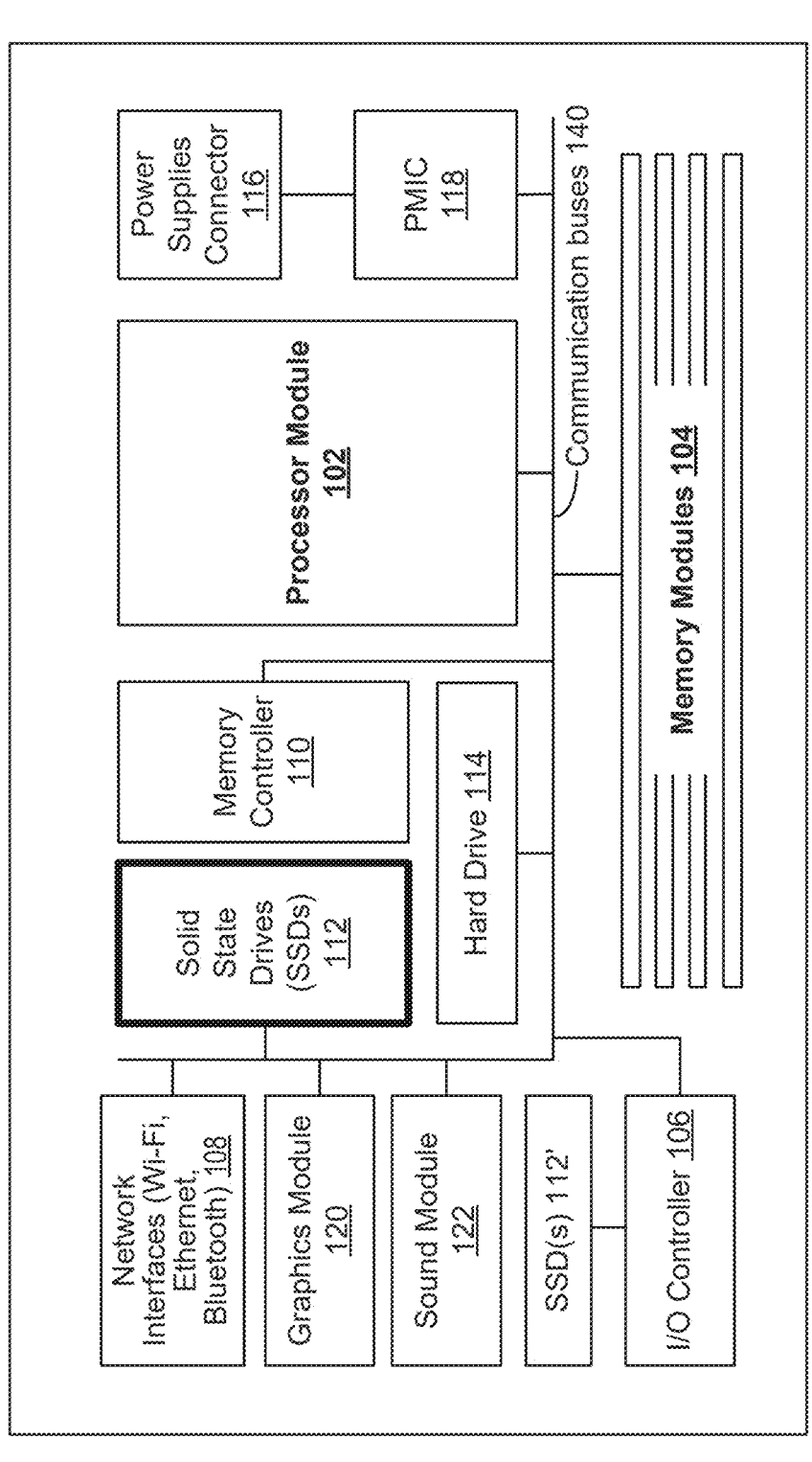
FIG. 1 is a block diagram of an example system module in a typical electronic device, in accordance with some embodiments.

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with storage capabilities.

A memory system (e.g., NAND flash-based solid state drives) has an address indirection table (AIT), where logical addresses are mapped to physical addresses. The AIT is stored in a DRAM or a non-volatile memory (e.g., a NAND flash memory). This invention optimizes a data layout for the AIT. In some embodiments, an array of physical addresses is stored for every logical address. Each physical address has a number of bits to represent every unique physical address location in the non-volatile memory (e.g., an SSD). As the capacity of the non-volatile memory increases, a number of physical address locations increases, and more bits are needed to store each and every physical address in the non-volatile memory. In an example, each physical address is represented by a 32-bit physical address entry, and the AIT is configured to fit each physical address entry in 4 bytes and fit 16 physical address entries in 64 bytes, which is a DRAM access size and a processor cache line size. In some implementations, each physical address is represented by an N-bit physical address entry, where N is greater than 32. The AIT has to be reconfigured to accommodate N-bit physical address entries efficiently without wasting DRAM space, while allowing these physical address entries to be accessed conveniently.

In some embodiments, thirty-one 33-bit physical address entries are stored in a physical address block having 128 bytes that spans two 64-byte DRAM accesses and two processor cache lines. Under some circumstances, the physical address block having 128 bytes are read jointly every time a memory controller reads one of the thirty-one physical address entries. Alternatively, under some circumstances, the physical address block having 128 bytes are read jointly when a memory controller read one of a subset of the thirty-one physical address entries, and the subset of physical address entries may include at least a half of the physical address block (i.e., may include more than fifteen physical address entries). In accordance with some embodiments of this application disclosed herein is the realization that reading the entire physical address block jointly increases read amplification and causes high latency, high power, and slow memory accesses. Further, in accordance with some embodiments of this application disclosed herein is the realization that similar issues exist when the memory controller writes a physical address to a 33-bit physical address entry via read-modify-write operations.

In accordance with various embodiments of this application, thirty-one 33-bit physical address entries are stored in a physical address block having 128 bytes. Each of thirty physical address entries are stored within a respective half of the physical address block, and only a remaining physical address entry that is distinct from the thirty physical address entries and spans two halves of the physical address block. Each of the thirty physical address entries has 33 bits, which further includes 32 bits stored in a respective 32-bit address word and a remaining bit stored in a supplemental address word. Both the respective address word and the supplemental address word are located within the same half of the physical address block, allowing the respective one of the thirty physical address entries to be conveniently obtained via consistent memory operations (e.g., bit shifting). Each half of the physical address block has a single supplemental address word, and the fifteen physical address entries share the supplemental address word and stores the remaining bit of each of the fifteen physical address entries therein. Two supplemental address words of the two halves of the physical address block store the remaining physical address entry jointly. As such, each of the thirty physical address entries may be accessed with a single 64-byte DRAM access and a single processor cache line, while only the remaining physical address entry may be accessed with two 64-byte DRAM accesses and two processor cache lines. This simplifies firmware programs to a small number of operations to read a 33-bit physical address entry and helps the memory device to attain high performance.

FIG. 1 is a block diagram of an example system module 100 in a typical electronic system in accordance with some embodiments. The system module 100 in this electronic system includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a trackpad) via a universal serial bus interface. In some embodiments, the network interfaces 108 includes one or more interfaces for Wi-Fi. Ethernet and Bluetooth networks, each allowing the electronic system to exchange data with an external source, e.g., a server or another electronic system. In some embodiments, the communication buses 140 include circuitry (sometimes called a chipset) that interconnects and controls communications among various system components included in system module 100.

In some embodiments, the memory modules 104 include high-speed random-access memory, such as static random-access memory (SRAM), double data rate (DDR) dynamic random-access memory (DRAM), or other random-access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a memory controller 110. SSD(s) 112, an HDD 114, power management integrated circuit (PMIC) 118, a graphics module 120, and a sound module 122. The memory controller 110 is configured to control communication between the processor module 102 and memory components, including the memory modules 104, in the electronic system. The SSD(s) 112 are configured to apply integrated circuit assemblies to store data in the electronic system, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V. 3.3V or 1.8V, as required by various components or circuits (e.g., the processor module 102) within the electronic system. The graphics module 120 is configured to generate a feed of output images to one or more display devices according to their desirable image/video formats. The sound module 122 is configured to facilitate the input and output of audio signals to and from the electronic system under control of computer programs.

Alternatively or additionally, in some embodiments, the system module 100 further includes SSD(s) 112' coupled to the I/O controller 106 directly. Conversely, the SSDs 112 are coupled to the communication buses 140. In an example, the communication buses 140 operates in compliance with Peripheral Component Interconnect Express (PCIe or PCI-E), which is a serial expansion bus standard for interconnecting the processor module 102 to, and controlling, one or more peripheral devices and various system components including components 110-122.

Further, one skilled in the art knows that other non-transitory computer readable storage media can be used, as new data storage technologies are developed for storing information in the non-transitory computer readable storage media in the memory modules 104. SSD(s) 112 or 112', and HDD 114. These new non-transitory computer readable storage media include, but are not limited to, those manufactured from biological materials, nanowires, carbon nanotubes and individual molecules, even though the respective data storage technologies are currently under development and yet to be commercialized.

Figure 2:
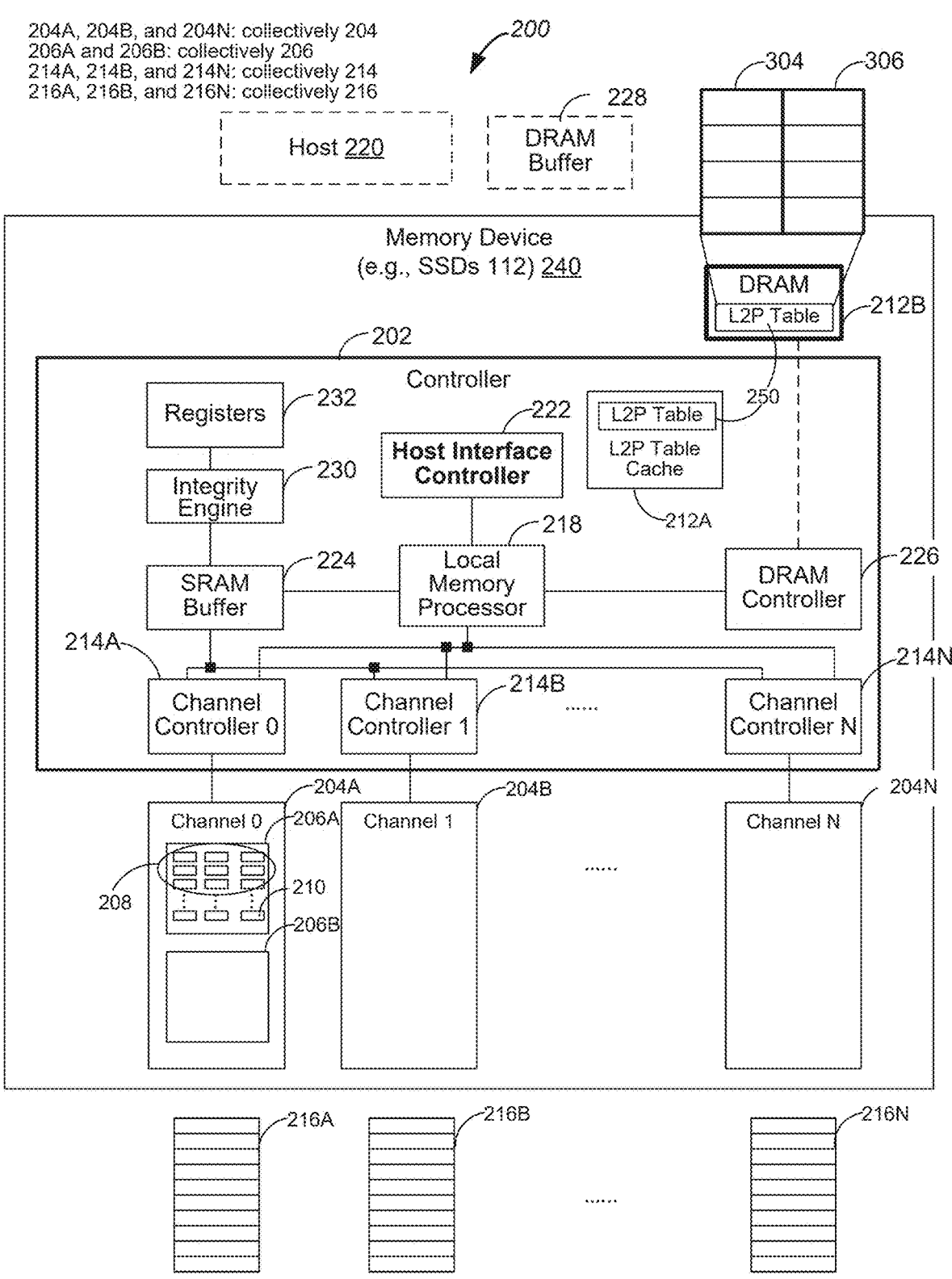
FIG. 2 is a block diagram of a memory system of an example electronic device having one or more memory access queues, in accordance with some embodiments.

FIG. 2 is a block diagram of a memory system 200 of an example electronic device having one or more memory access queues, in accordance with some embodiments. The memory system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the memory system 200 and process the instructions and data to run an operating system and execute user applications. The memory system 200 includes one or more memory devices 240 (e.g., SSD(s)). Each memory device 240 further includes a controller 202 and a plurality of memory channels 204 (e.g., channel 204A. 204B, and 204N). Each memory channel 204 includes a plurality of memory cells. The controller 202 is configured to execute firmware level software to bridge the plurality of memory channels 204 to the host device 220. In some embodiments, each memory device 240 is formed on a printed circuit board (PCB).

Each memory channel 204 includes on one or more memory packages 206 (e.g., two memory dies). In an example, each memory package 206 (e.g., memory package 206A or 206B) corresponds to a memory die. Each memory package 206 includes a plurality of memory planes 208, and each memory plane 208 further includes a plurality of memory pages 210. Each memory page 210 includes an ordered set of memory cells, and each memory cell is identified by a respective physical address. In some embodiments, the memory device 240 includes a plurality of superblocks. Each superblock includes a plurality of memory blocks each of which further includes a plurality of memory pages 210. For each superblock, the plurality of memory blocks are configured to be written into and read from the memory system via a memory input/output (I/O) interface concurrently. Optionally, each superblock groups memory cells that are distributed on a plurality of memory planes 208, a plurality of memory channels 204, and a plurality of memory dies 206. In an example, each superblock includes at least one set of memory pages, where each page is distributed on a distinct one of the plurality of memory dies 206, has the same die, plane, block, and page designations, and is accessed via a distinct channel of the distinct memory die 206. In another example, each superblock includes at least one set of memory blocks, where each memory block is distributed on a distinct one of the plurality of memory dies 206 includes a plurality of pages, has the same die, plane, and block designations, and is accessed via a distinct channel of the distinct memory die 206. The memory device 240 stores information of an ordered list of superblocks in a cache of the memory device 240. In some embodiments, the cache is managed by a host driver of the host device 220, and called a host managed cache (HMC).

In some embodiments, the memory device 240 includes a single-level cell (SLC) NAND flash memory chip, and each memory cell stores a single data bit. In some embodiments, the memory device 240 includes a multi-level cell (MLC) NAND flash memory chip, and each memory cell of the MLC NAND flash memory chip stores 2 data bits. In an example, each memory cell of a triple-level cell (TLC) NAND flash memory chip stores 3 data bits. In another example, each memory cell of a quad-level cell (QLC) NAND flash memory chip stores 4 data bits. In yet another example, each memory cell of a penta-level cell (PLC)

NAND flash memory chip stores 5 data bits. In some embodiments, each memory cell can store any suitable number of data bits. Compared with the non-SLC NAND flash memory chips (e.g., MLC SSD. TLC SSD. QLC SSD. PLC SSD), the SSD that has SLC NAND flash memory chips operates with a higher speed, a higher reliability, and a longer lifespan, and however, has a lower device density and a higher price.

Each memory channel 204 is coupled to a respective channel controller 214 (e.g., controller 214A, 214B, or 214N) configured to control internal and external requests to access memory cells in the respective memory channel 204. In some embodiments, each memory package 206 (e.g., each memory die) corresponds to a respective queue 216 (e.g., queue 216A, 216B, or 216N) of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the memory device 240 corresponds to a single queue 216 of memory access requests. Each memory access request is optionally received internally from the memory device 240 to manage the respective memory channel 204 or externally from the host device 220 to write or read data stored in the respective channel 204. Specifically, each memory access request includes one of: a system write request that is received from the memory device 240 to write to the respective memory channel 204, a system read request that is received from the memory device 240 to read from the respective memory channel 204, a host write request that originates from the host device 220 to write to the respective memory channel 204, and a host read request that is received from the host device 220 to read from the respective memory channel 204. It is noted that system read requests (also called background read requests or non-host read requests) and system write requests are dispatched by a memory controller to implement internal memory management functions including, but are not limited to, garbage collection, wear levelling, read disturb mitigation, memory snapshot capturing, memory mirroring, caching, and memory sparing.

In some embodiments, in addition to the channel controllers 214, the controller 202 further includes a local memory processor 218, a host interface controller 222, an SRAM buffer 224, and a DRAM controller 226. The local memory processor 218 accesses the plurality of memory channels 204 based on the one or more queues 216 of memory access requests. In some embodiments, the local memory processor 218 writes into and read from the plurality of memory channels 204 on a memory block basis. Data of one or more memory blocks are written into, or read from the plurality of channels jointly. No data in the same memory block is written concurrently via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. Additionally, a number of memory blocks to be accessed jointly and a size of each memory block are configurable for each of the system read, host read, system write, and host write operations.

In some embodiments, the local memory processor 218 stores data to be written into, or read from, each memory block in the plurality of memory channels 204 in an SRAM buffer 224 of the controller 202. Alternatively, in some embodiments, the local memory processor 218 stores data to be written into, or read from, each memory block in the plurality of memory channels 204 in a DRAM buffer 212B that is included in memory device 240, e.g., by way of the DRAM controller 226. Alternatively, in some embodiments, the local memory processor 218 stores data to be written into, or read from, each memory block in the plurality of memory channels 204 in a DRAM buffer 228 that is main memory used by the processor module 102 (FIG. 1). The local memory processor 218 of the controller 202 accesses the DRAM buffer 228 via the host interface controller 222.

In some embodiments, data in the plurality of memory channels 204 is grouped into coding blocks, and each coding block is called a codeword. For example, each codeword includes n bits among which k bits correspond to user data and (n-k) corresponds to integrity data of the user data, where k and n are positive integers. In some embodiments, the memory device 240 includes an integrity engine 230 (e.g., an LDPC engine) and registers 232, which include a plurality of registers or SRAM cells or flip-flops and are coupled to the integrity engine 230. The integrity engine 230 is coupled to the memory channels 204 via the channel controllers 214 and SRAM buffer 224. Specifically, in some embodiments, the integrity engine 250) has data path connections to the SRAM buffer 224, which is further connected to the channel controllers 214 via data paths that are controlled by the local memory processor 218. The integrity engine 230 is configured to verify data integrity and correct bit errors for each coding block of the memory channels 204.

In some embodiments, the memory system 200 includes an SSD having an L2P address indirection table 250 that stores physical addresses for a set of logical addresses, e.g., a logical block address (LBA). In some embodiments, the L2P address indirection table 250) is stored in an L2P table cache 212A included in the controller 202. Alternatively, in some embodiments, the memory system 200 includes a DRAM module 212B, and the L2P address indirection table 250 is stored in the DRAM module 212B. The local memory processor 218 of the controller 202 accesses the DRAM module 212B via a DRAM controller 226. In an example, the SSD has a memory capacity of 32 terabytes (i.e., 32 TB) organized into a plurality of memory sectors, and each memory sector stores 4096 bytes (i.e., 4 KB) and is individually addressable. The SSD includes 8 billion memory sectors identified by 8 billion physical addresses. At least 33 data bits are needed to uniquely represent each and every individual physical address of the SSDs having 8 billion physical addresses. If the physical addresses are successively numbered starting from 0), a corresponding decimal value of the 33 data bits does not reach or go beyond 8 billion.

Some implementations of this application are directed to efficiently packing physical addresses in an L2P address indirection table of a memory system (e.g., SSDs 112 of the system module 100 in FIG. 1). The physical addresses stored in the L2P address indirection table including a plurality of address blocks. Each address block includes a plurality of physical addresses (e.g., 31 33-bit physical addresses) corresponding to an ordered sequence of logical addresses. Each logical address corresponds to a distinct physical address. For each address block, each of a first subset of physical addresses (e.g., 30 physical addresses) includes a first physical address and a respective bit of a supplemental word that is located in the same portion of the respective address block. Each of a second subset of remaining physical addresses (e.g., 1 physical address) includes a plurality of address bit groups distributed among respective supplemental words located in different portions of the respective address block. By these means, when stored into the memory system, the plurality of physical addresses are packed in a way that is easier for firmware to process, thereby enhancing memory access performance without increasing the memory space of a cache 212A or DRAM module 212B used to store the L2P address indirection table.

Figure 3:
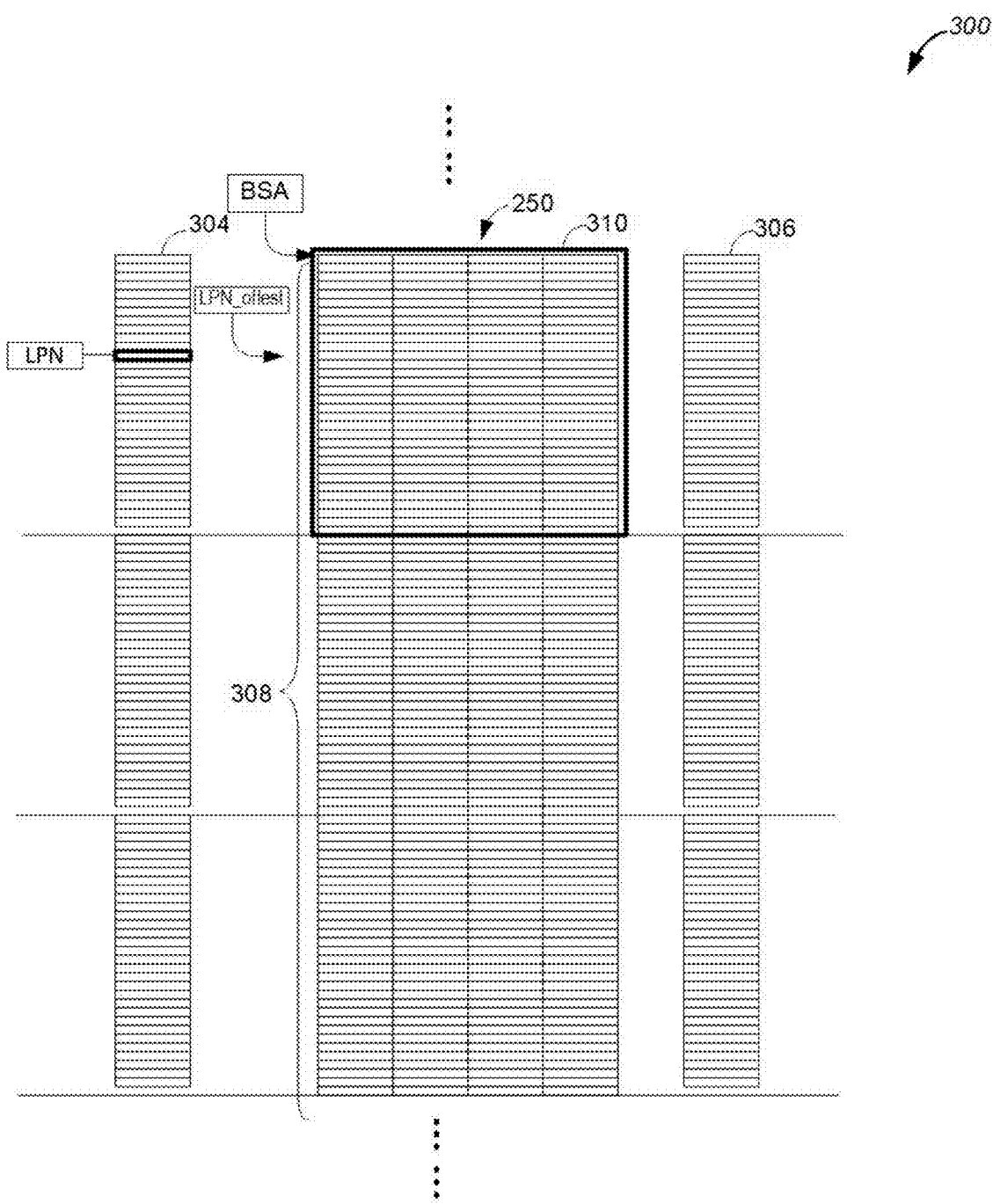
FIG. 3 is a diagram illustrating a data structure of an example physical address block associated with a logical-to-physical (L2P) address indirection table (AIT), in accordance with some embodiments.

FIG. 3 is a diagram illustrating a data structure 300 of a logical-to-physical (L2P) address indirection table (AIT) 250, in accordance with some embodiments. The AIT 250 includes a plurality of physical address entries 306 corresponding to a plurality of indices that correspond to a plurality of logical addresses 304 (also called logical page number (LPN)). In an example, each index or associated LPN 304 is an integer, and the plurality of indices starts with 0 and increases at a step of 1 to represent individual logical address 304. Each of the plurality of physical address entries 306 identifies a physical address 306 in memory channels 204 of the memory system 200, and corresponds to a respective logical address 304. In this application. "physical address entry" and "physical address" are used in an exchangeable manner. The plurality of physical address entries 306 are stored in the AIT 250 according to a predefined data structure 300. In some embodiments, the plurality of indices of the logical addresses 304 are implicitly associated with address locations or relative positions of the physical address entries 306 in the AIT 250 without being physically stored in the AIT 250. Stated another way, the AIT 250 include only the plurality of physical addresses 306, and the respective logical address 304 of each physical address is determined based on the predefined data structure 300. The AIT 250 allows the memory system 200 to perform wear leveling by moving logical addresses 304 to different physical addresses 306.

In some embodiments, the AIT 250 is stored in a DRAM 212B (FIG. 2) having a plurality of words 308, and each word 308 has a plurality of bytes (e.g., 4 bytes having 32 bits in total). As a storage capacity of the memory channels 204 of the memory system 200 increases, and each physical address 306 may increase beyond 32 bits and have to be stored in more than one word 308. For example, a physical address 306 may have 33 bits, and the data structure 300 is applied to store thirty-one physical address entries 306 corresponding to thirty-one 33-bit physical addresses 306 in each address block 310. Each address block 310 includes 128 bytes organized in the plurality of 4-byte words 308. Additionally, in some embodiments, error correction is implemented on 64 byte memory blocks, and a processor cache line has 64 bytes.

In some embodiments, a logical page number (LPN) 304 represents a logical address 304 and corresponds to a page of physical memory, e.g., having a size of 4 KB. Based on the AIT 250 stored in the cache 212A or the DRAM 212B (FIG. 2), the LPN 304 is translated to a physical address 306 of this page in the memory channels 204. The physical address 306 is stored in a physical address entry 306 in an address block 310 within the AIT 250. Further, the address block 310 has a block start address (BSA) pointing to a start location of the address block 310 (e.g., 128 bytes) within the AIT 250. Further, the address BSA of the first address block 310 is equal to the AIT start address. In some embodiments, the AIT 250 starts at an initial word address of 0), where each address word has four 8-bit words, and the LPN 304 starts with 0 for the AIT. The block start address BSA of the address block 310 is represented as follows:

$$BSA = AIT \text{ start address} + \text{floor}(LPN/31) \times 128. \qquad (1)$$

A location of the logical address 304 corresponding to the LPN 304 in the AIT 250 is determined as follows:

$$X = \text{floor}(LPN/31) \times 31, \qquad (2)$$

and $$LPN\_offset = LPN \text{ modulo } 31, \qquad (3)$$

where X identifies the address block 310 to which the LPN 304 belongs to, and the LPN_offset identifies a relative location of the LPN 304 in the address block 310. For example, if the address block 310 is the tenth block in the AIT 250 and the AIT start address is 0), the address BSA of the address block 310 is 1152, the address block 310 starts from the 1152-th byte in the AIT 250. In another example, the logical address 304 is 120 in a sequence of logical addresses starting from 0). The logical address 304 corresponds to the 28-th physical address 306 in the fourth address block 310, because X is equal to 3 and LPN_offset is equal to 27.

Figure 4:
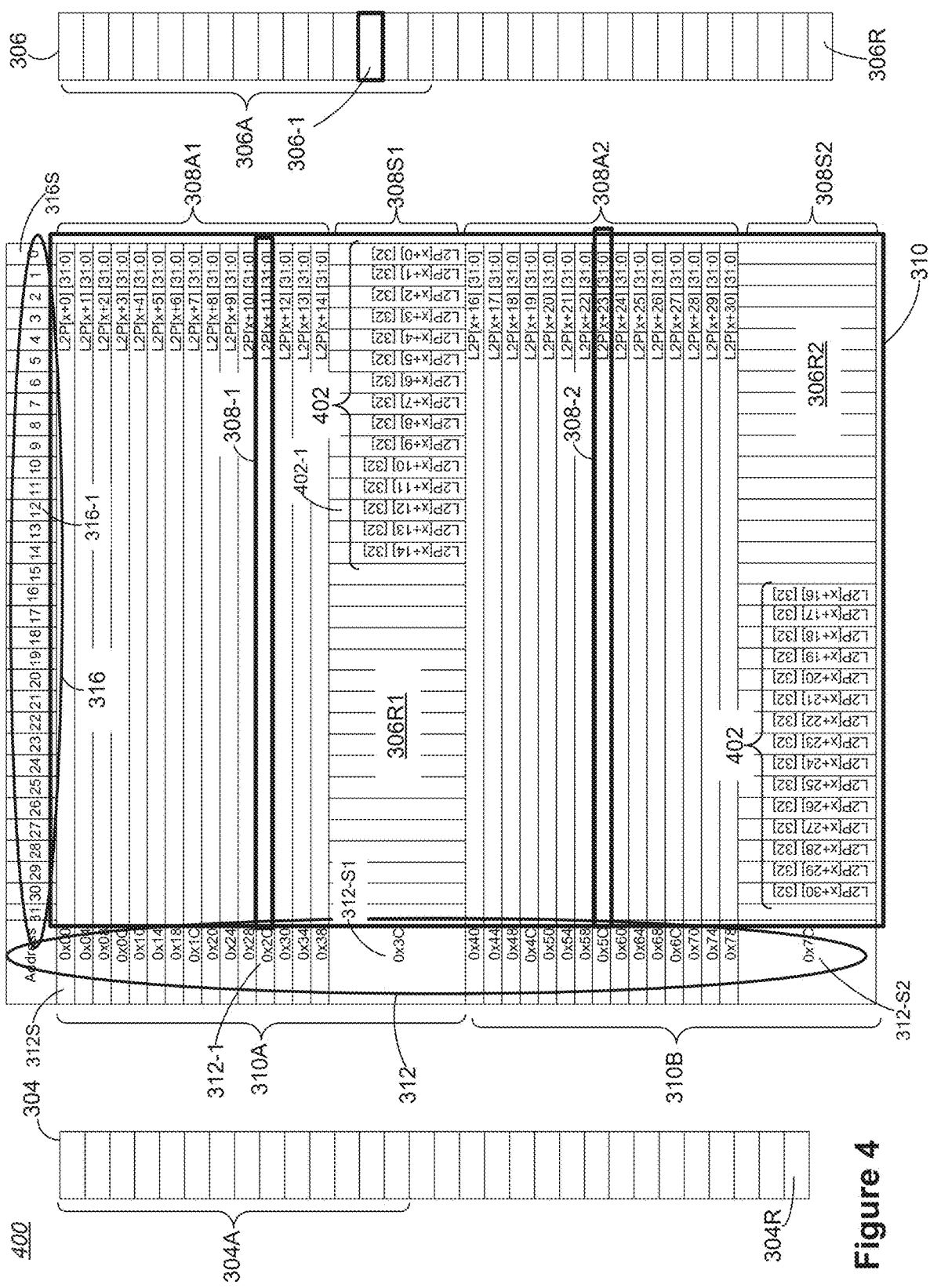
FIG. 4 is a diagram illustrating a block-level data structure of an example 128-byte address block associated with an L2P AIT, in accordance with some embodiments.

FIG. 4 is a diagram illustrating a block-level data structure 400 of an example address block 310 associated with an L2P AIT 250, in accordance with some embodiments. The address block 310 has 128 bytes grouped to an ordered sequence of address words 308 (e.g., 32 32-bit address words). Each physical address entry 306 corresponds to a 33 bit physical address 306. In some embodiments, 31 physical address entries 306 correspond to 31 logical addresses 304, and are mapped to 32 address words 308 of the 128-byte address block 310 in the cache 212A or the DRAM 212B (FIG. 2). When a read or write operation is implemented based on each of a subset of the thirty-one LPNs (e.g., 30 LPNs) 304A, the memory controller 202 only access a half 310A or 310B of the address block 310 to access a respective physical address 306A. When a read or write operation is implemented based on a remaining LPN 304R, the memory controller 202 accesses both halves 310A and 310B of the address block 310 to access a corresponding remaining physical address 306R including two sets of bits 306R1 and 306R2).

For the subset of the thirty-one LPNs 304A, each respective physical address 306A includes 33 bits that are stored in 32 bits of a respective address word 308A (e.g., 308A1 or 308A2) and a remaining bit 402 of a respective supplemental address word 308S (e.g., 308S1 or 308S2). The remaining bit 402 of the supplemental address word 308S is shifted to a bit position determined based on the location (LPN_offset) of the LPN 304A in the address block 310. For each of the subset of LPNs 304A located in either half 310A or 310B of the address block 310, the bit position in the supplemental address 306S matches the word location of the address word 308A of the physical address 306A in the address block 310. A fixed scheme of bit shifting offset and addition to the address BSA is used to determine the address word 308A corresponding to the subset of LPNs 304A in the address block 310. The same software operations are applied to access physical addresses 306A corresponding to the subset of LPNs 304A, thereby enhancing a memory access rate.

In some embodiments, a remaining bit 402 is stored at the supplemental address word 308S having a bit location 306 that can be identified by a bitwise OR operation. No addition or subtraction is applied to identify the bit location 306 of the remaining bit 402. Alternatively, for each physical address 306A corresponding to a respective LPN 304A, the memory controller 202 identifies the respective address word 308A and the supplemental address word 308S, as well as a remaining bit in the supplemental address word 308S. In some embodiments, a bitwise operation OR with 0x000000000000003 C is optionally applied to determine a location 312 of a corresponding address word 308S in the address block 310. In some embodiments, a bitwise operation AND with 0xFFFFFFFFFFFFFFC0 is optionally applied to determine a location 312 of a corresponding address word 308S in the address block 310.

In some embodiments, a remaining LPN 304R corresponds to a remaining physical address 306R for which a first subset of bits (e.g., 16 bits) 306R1 is stored within the supplemental word 308S1 of the half 310A of the address block 310 and a second subset of bits (e.g., 17 bits) 306R2 is stored within the supplemental word 308S2 of the half 310B of the address block 310. The memory controller 202 is configured to access the entire address block 310 to extract the corresponding physical address 306R. For example, a program written in C programming language is applied to read a physical address from an address block 310 as follows (note that some multiplications by powers of 2 may be replaced with bit shifts and some addition operations may be replaced with bitwise OR operations):

word 308-1. The first bit location 306-1 in the supplemental word 308S1 matches the first word location 312-1 in the address block 310. The memory controller 202 extracts at least the first bit 402-1 from the first bit location 306-1 of the supplemental word 308S1, and generates the first physical address 306-1 based on the first word 308-1 and the first bit 402-1.

In some embodiments, the first bit location 306-1 is measured successively from a start bit 306S of the supplemental word 308S1 and represented by a first integer number (e.g., 12), and the first word location 312-1 is measured successively from a start word 312S of the address block 310 and represented by a second integer number (e.g., 12). The first integer number is determined based on the second integer number, e.g., using bit shifting, multiplication, addition, subtraction, bit flipping, or a lookup table. For example, the first word location 312-1 identifies the thirteenth word in a half 310A of the address block 310 as the first word 308-1. The first integer number is equal to the second integer number, and the first bit location 306-1 identifies the thirteenth bit in the supplemental word 308S as the first bit 402-1.

In some embodiments, the supplemental word 308S1 is selected from a plurality of word choices 308S located at a plurality of distinct known word locations (e.g., 312-S1 and 312-S2) in the address block 310. Further, in some embodiments, the plurality of word choices 308S include two word choices located at two distinct word locations 312-S1 and 312-S2 in the address block 310. A first word choice 308S1 is located in a top half 310A of the address block 310, and a second word choice 308S2 is located in a bottom half 310B of the address block 310. In some embodiments not shown, the supplemental word 308S1 or 308S2 of either half 310A

```
uint64_tread_L2P_entry(uint64_t LPN, uint32_t* pL2P_Table)
{
    uint64_t block_start_address = (uint64_t)(pL2P_Table) + (LPN / 31) * 128;
    uint8_t LPN_offset = LPN % 31;
    uint64_t L2P_addr = block_start_address+ (LPN_offset<<2);
    uint64_t L2P_entry;
    if (LPN_offset== 15)
    {
    uint32_t L2P_entry_upper17 =*((uint32_t*)(L2P_addr)) & 0xFFFF8000;
    uint32_t L2P_entry_lower16 = *((uint32_t*)(L2P_addr|0x40) & 0x0000FFFF;
    L2P_entry = ((uint64_t)(L2P_entry_upper17) << 1) |
       ((uint64_t)(L2P_entry_lower16));
    }
    else
    {
    uint32_t L2P_entry_upper1=(*((uint32_t*)(L2P_addr| 0x3C)) >> LPN_offset)&1;
    uint32_t L2P_entry_lower32 = *((uint32_t*)(L2P_addr));
    L2P_entry = ((uint64_t)(L2P_entry_upper1 ) << 32) |
       ((uint64_t)(L2P_entry_lower32)   );
    }
    return L2P_entry;
}
```

In various embodiments of this application, a memory controller 202 (FIG. 2) identifies an address block 310 including a plurality of physical addresses 306 that corresponds to an ordered sequence of logical addresses 304. Each logical address 304 corresponds to a distinct physical address 306. The memory controller 202 determines that a first physical address 306-1 is associated with a first word 308-1 having a first word location 312-1 in the address block 310. The first word 308-1 is extracted from the first word location 312-1 in the address block 310. Based on the first word location 312-1, a first bit location 306-1 is determined in a supplemental word 308S1 that is distinct from the first or 310B is a word leading the respective half 310A or 310B. Alternatively, in some embodiments, the supplemental word 308S1 or 308S2 of either half 310A or 31B is in a predefined known location in the respective half 310A or 310B. In some embodiments, the supplemental word 308S1 or 308S2 of either half 310A or 310B is the last word in the respective half 310A or 310B.

A bitwise logic operation may be applied on a set of one or more first predefined bits of a binary representation of the first word location 312-1 to determine a set of one or more first bits of a binary representation of one of the two distinct word locations 312-S1 and 312-S2. Specifically, the first word location 312-1 is 0x2 C, and has a binary representation ended with 0010 1100. The two distinct word locations haves addresses 0x3 C and 0x7 C in the address block 310, and the binary representations of these two distinct word locations 312-S1 and 312-S2 of the supplemental word 308S are ended with 0011 1100 and 0111 1100. The binary representations of the two distinct word locations 312-S1 and 312-S2 of the two word choices differ by one bit. The bitwise logic operation includes an OR operation or an AND operation. In an example, an OR logic operation is applied on the third bit and the fourth bit and the fifth bit and the sixth bit from the end of the binary representation ended with 0010 1100 and "1111" to determine the third and fourth and fifth and sixth least significant bits of the word address 312-S1 of the supplemental word 308S1.

In some embodiments, bit locations of the predefined bit of the binary representation of the first word location 312-1 and the corresponding bit of the binary representation of one of the two distinct word locations 312-S1 and 312-S2 matches one another. For example, the third and fourth and fifth and sixth bits from the end of the binary representation of the first word location 312-1 is used to determine the third and fourth and fifth and sixth bits from the end of the binary representation of the word address 312-S1 of the supplemental word 308S1.

In some embodiments, the plurality of word choices 308S include two word choices 308S1 and 308S2 located at two distinct word locations 312-S1 and 312-S2 in the address block 310. A second predefined bit (e.g., the seventh-bit from the end) of a binary representation of the first word location 312-1 is extracted, and applied to determine a corresponding second bit (e.g., the seventh-bit from the end) of a binary representation of a supplemental word location 312-S1 of the supplemental word 308S1. The supplemental word 308S1 is selected from the two word choices 308S1 and 308S2 based on the corresponding bit (e.g., the seventh bit from the end of the binary representation) of the supplemental word location 312-S1. For example, the seventh bit of the first word location 312-1 is "0." and the supplemental word 308S1 at the word location 312-S1 is selected. In another example, a seventh bit of a binary representation of a word location (e.g., ended with 0101 1100) of a second word 308-2 is "1." and the supplemental word 308S2 at the word location 312-S2 is selected. The second predefined bits of the binary representation of the first word location 312-1 and the supplemental word 308S1 are equal to each other.

It is noted that the first word 308-1 and the supplemental word 308S1 providing the remaining bit 402-1 are both included in the same half 310A of the address block 310. In response to a memory access request associated with the first physical address 306-1, only the half 310A of the address block 310 (e.g., 64 bytes) need to be extracted from the cache 212A or the DRAM 212B (FIG. 2). The memory controller 202 does not need to extract the entire address block 310 (e.g., including 128 bytes). The same situation applies to 30 out of 31 physical addresses 306 stored in the address block 310. Each of a first subset of physical addresses (e.g., the first 15 physical addresses 306A) is stored in the half 310A of the address block 310, and split between a respective address word 308A1 and a respective supplemental word 308S1. Each of a second subset of physical addresses (e.g., the second 15 physical addresses 306A) is stored in the half 310B of the address block 310, and split between a respective address word 308A2 and a respective bit 402 in the supplemental word 308S2. In an example, the address block 310 includes 128 bytes and corresponds to 31 physical addresses, and each physical address 306 has 33 bits.

In some embodiments, the address block 310 consists of a plurality of non-overlapping portions (e.g., 310A and 310B), and each portion of the address block 310 includes a respective word choice configured to provide the supplemental word 308S to remaining address words 308A in the respective portion of the address block 310. These non-overlapping portions are complemental to each other to form the address block 310 jointly. Some embodiments of this application have two non-overlapping portions 310A and 310B. It is known to those of ordinary skill in the art that the address block 310 may include more than two non-overlapping portions. For example, the address block 310 may include four non-overlapping portions each of which has a supplemental word 308S. Each of a subset of physical addresses is provided by a respective address word 308A and the supplemental word 308S located in a respective portion of the address block 310, and each of one or more remaining physical address 306R is formed by bits from two or more supplemental words 308S that are distributed in two or more portions of the address block 310.

Referring to FIG. 4, in some embodiments, the supplemental word 308S1 of the half 310A of the address block 310 includes a set of remaining bit 402 and a second set of leftover bits 306R1. The supplemental word 308S2 of the half 310B of the address block 310 includes a set of remaining bit 402 and a second set of leftover bits 306R2. In either half 310A or 310B of the address block 310, the set of remaining bit 402 are grouped with the other address words 308A in the same half of the address block 310. The second sets of leftover bits 306R1 and 306R2 of the plurality of the two halves 310A and 310B are consolidated to provide a remaining physical address 306R. In some embodiments, the memory controller receives a request associated with the remaining physical address. In response to the request, the memory controller extracts both of the halves 310A and 310B of the address block 310 from the cache 212A or the DRAM 212B (FIG. 2).

In an example, the address block 310 includes 128 bytes and corresponds to 31 physical addresses 306, and each physical address 306 has 33 bits. The address block 310 is divided into two portions (e.g., the halves 310A and 310B), each of which includes 64 successive bytes (e.g., grouped into 16 4-byte address words), and each portion stores 15 complete physical addresses 306A. Each portion has a single supplemental word 308S, and supplemental words 308S of the two portions provide a remaining physical address 306R jointly.

Figure 5:
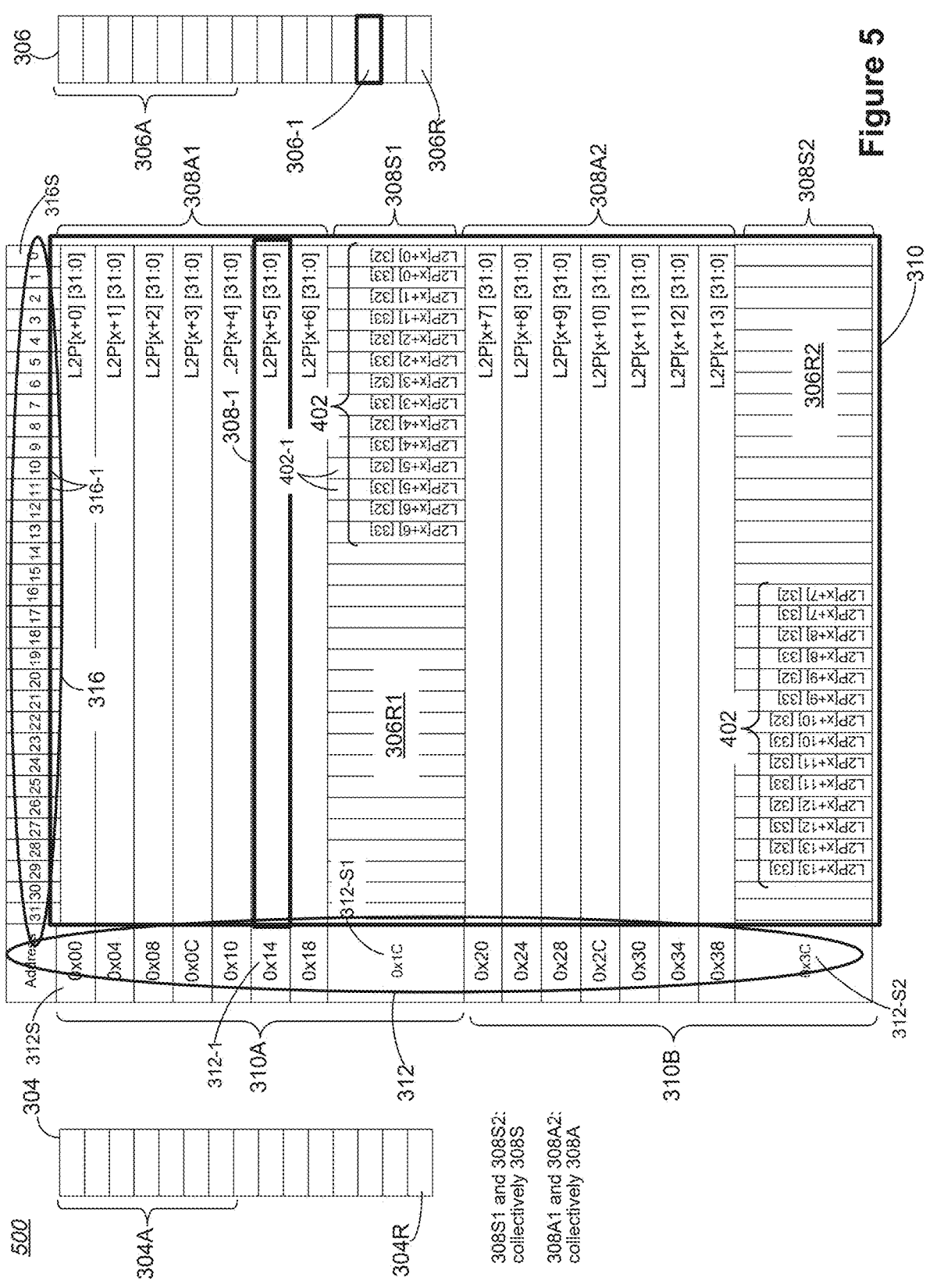
FIG. 5 is a diagram illustrating a block-level data structure of an example 64-byte address block associated with an L2P AIT, in accordance with some embodiments.

FIG. 5 is a diagram illustrating a block-level data structure 500 of an example address block 310 associated with an L2P AIT 250, in accordance with some embodiments. The address block 310 has 64 bytes grouped to an ordered sequence of address words 308 (e.g., 16 32-bit address words). Each physical address entry 306 corresponds to a 34 bit physical address 306. In some embodiments, 15 physical address entries 306 correspond to 15 logical addresses 304, and are mapped to 16 address words 308 of the 64-byte address block 310 in the cache 212A or the DRAM 212B (FIG. 2). When a read or write operation is implemented based on each of a subset of the fifteen LPNs (e.g., 14 LPNs) 304A, the memory controller 202 only accesses a half 310A or 310B of the address block 310 to access a respective physical address 306A. When a read or write operation is implemented based on a remaining LPN 304R, the memory controller 202 accesses both halves 310A and 310B of the address block 310 to access a corresponding remaining physical address 306R including two sets of bits 306R1 and 306R2).

For the subset of the fifteen LPNs 304A, each respective physical address 306A includes 34 bits that are stored in 32 bits of a respective address word 308A (e.g., 308A1 or 308A2) and two remaining bits 402 of a respective supplemental address word 308S (e.g., 308S1 or 308S2). The two remaining bits 402 of the supplemental address word 308S are located at bit positions determined based on the location (LPN_offset) of the LPN 304A in the address block 310. For each of the subset of LPNs 304A located in either half 310A or 310B of the address block 310, the bit positions in the supplemental address 306S are associated with the word location of the address word 308A of the physical address 306A in the address block 310, e.g., according to a pre-defined relation (which applies to all address words 308A in the portion 310A of the address block 310).

In various embodiments of this application, a memory controller 202 (FIG. 2) identifies an address block 310 including a plurality of physical addresses 306 that corresponds to an ordered sequence of logical addresses 304. Each logical address 304 corresponds to a distinct physical address 306. The memory controller 202 determines that a first physical address 306-1 is associated with a first word 308-1 having a first word location 312-1 in the address block 310. The first word 308-1 is extracted from the first word location 312-1 in the address block 310. Based on the first word location 312-1, two bit locations 306-1 are determined in a supplemental word 308S1 that is distinct from the first word 308-1. The two bit locations 306-1 in the supplemental word 308S1 are associated with the first word location 312-1 in the address block 310. The memory controller 202 extracts at least the first bits 402-1 from the two bit locations 306-1 of the supplemental word 308S1, and generates the first physical address 306-1 based on the first word 308-1 and the first bits 402-1.

In some embodiments, the two bit locations 306-1 are measured successively from a start bit 306S of the supplemental word 308S1 and represented by two first integer numbers (e.g., 10 and 11), and the first word location 312-1 is measured successively from a start word 312S of the address block 310 and represented by a second integer number (e.g., 5). The first integer number is determined based on the second integer number, e.g., using bit shifting, multiplication, addition, subtraction, bit flipping, or a lookup table. For example, the first word location 312-1 identifies the sixth word in a half 310A of the address block 310 as the first word 308-1. One of the first integer numbers is equal to twice of the second integer number, and the bit locations 306-1 identify the eleventh and twelfth bits in the supplemental word 308S as the first bits 402-1.

In some embodiments, the supplemental word 308S1 is selected from a plurality of word choices 308S located at a plurality of distinct known word locations (e.g., 312-S1 and 312-S2) in the address block 310. Further, in some embodiments, the plurality of word choices 308S include two word choices located at two distinct word locations 312-S1 and 312-S2 in the address block 310. A first word choice 308S1 is located in a top half 310A of the address block 310, and a second word choice 308S2 is located in a bottom half 310B of the address block 310. In some embodiments not shown, the supplemental word 308S1 or 308S2 of either half 310A or 310B is a word leading the respective half 310A or 310B. Alternatively, in some embodiments, the supplemental word 308S1 or 308S2 of either half 310A or 31B is in a predefined known location in the respective half 310A or 310B. In some embodiments, the supplemental word 308S1 or 308S2 of either half 310A or 310B is the last word in the respective half 310A or 310B.

Referring to FIG. 5, in some embodiments, the supplemental word 308S1 of the half 310A of the address block 310 includes a set of remaining bit 402 and a second set of leftover bits 306R1. The supplemental word 308S2 of the half 310B of the address block 310 includes a set of remaining bit 402 and a second set of leftover bits 306R2. In either half 310A or 310B of the address block 310, the set of remaining bit 402 are grouped with the other address words 308A in the same half of the address block 310. The second sets of leftover bits 306R1 and 306R2 of the plurality of the two halves 310A and 310B are consolidated to provide a remaining physical address 306R. In some embodiments, the memory controller receives a request associated with the remaining physical address. In response to the request, the memory controller extracts both of the halves 310A and 310B of the address block 310 from the cache 212A or the DRAM 212B.

In an example, the address block 310 includes 64 bytes and corresponds to 15 physical addresses 306, and each physical address 306 has 34 bits. The address block 310 is divided into two portions (e.g., the halves 310A and 310B), each of which includes 32 successive bytes (e.g., grouped into 8 4-byte address words), and each portion stores 7 complete physical addresses 306A. Each portion 310A or 310B has a single supplemental word 308S, and supplemental words 308S of the two portions 310A and 310B provide a remaining physical address 306R jointly.

FIG. 6 is a flow diagram of a method 600 for compressing addresses stored in an L2P address indirection table 250, in accordance with some embodiments. The method 600 is implemented at an electronic device including the memory system 200 (FIG. 2). The electronic device identifies (operation 602) an address block 310 including a plurality of physical addresses 306 that corresponds to an ordered sequence of logical addresses 304 (FIG. 3). Each logical address 304 corresponds (operation 604) to a distinct physical address 306. The electronic device determines (operation 606) that a first physical address 306-1 is associated with a first word 308-1 having a first word location 312-1 (FIG. 4) in the address block 310, and extracts (operation 608) the first word 308-1 from the first word location 312-1 in the address block 310. Based on the first word location 312-1, the electronic device determines (operation 610) a first bit location 306-1 in a supplemental word 308S1 that is distinct from the first word 308-1. The first bit location 306-1 in the supplemental word 308S1 is associated (operation 612) with the first word location 312-1 in the address block 310, e.g., according to a predefined relationship. The electronic device extracts (operation 614) at least a first bit 402-1 from the first bit location 306-1 of the supplemental word 308S1, and generates (operation 616) the first physical address 306-1 based on the first word 308-1 and the first bit 402-1.

In some embodiments, the first bit location 306-1 is measured successively from a start bit 306S of the supplemental word 308S1 and represented by a first integer number (e.g., 11), and the first word location 312-1 is measured successively from a start word of the address block 310 and represented by a second integer number (e.g., 11). The first integer number is determined from the second integer number. In an example, the first integer number X includes 10 and 11, and the second integer Y is 5 (FIG. 5). The first integer number X is equal to 2Y and 2Y+1.

In some embodiments, the electronic device selects the supplemental word 308S1 from a plurality of word choices 308S located at a plurality of distinct known word locations (e.g., 312-S1 and 312-S2 in FIG. 4) in the address block 310. Further, in some embodiments, the plurality of word choices 308S include two word choices 308S1 and 308S2 located at two distinct word locations 312-S1 and 312-S2 in the address block 310. The electronic device selects the supplemental word 308S1 by applying a bitwise logic operation on a set of first predefined bits of a binary representation of the first word location 312-1 to determine a set of first corresponding bits of a binary representation of one of the two distinct word locations 312-S1 and 312-S2. Additionally, in some embodiments, bit locations of each first predefined bit of the binary representation of the first word location 312-1 and a corresponding first bit of the binary representation of one of the two distinct word locations matches one another. For example, the bitwise logic operation includes an OR operation or an AND operation. In some embodiments, binary representations (e.g., 0x1 C and 0x3 C) of the two distinct word locations 312-S1 and 312-S2 of the two word choices 308S differ by one bit In some embodiments, the plurality of word choices 308S include two word choices 308S1 and 308S2 located at two distinct word locations 312-S1 and 312-S2 (FIGS. 4 and 5) in the address block 310. The electronic device selects the supplemental word 308S1 by extracting a second predefined bit of a binary representation of the first word location 312-1 and determining a corresponding second bit of a binary representation of a supplemental word location 312-S1 of the supplemental word 308S1 based on the second predefined bit of the binary representation of the first word location 312-1. The supplemental word 308S1 is selected from the two word choices 308S based on the corresponding second bit of the supplemental word location 312-S1.

In some embodiments, the electronic device includes a memory controller 202 (FIG. 2) and a volatile memory (e.g., cache 212A. DRAM 212B), and the volatile memory stores a logical-to-physical (L2P) address indirection table (AIT) 250 including the address block 310. A portion 310A of the address block 310 includes both of the first word 308-1 and the supplemental word 308S1, and the portion 310A is less than all of the address block 310. The memory controller 202 obtains a request for the first physical address 306-1, and in response to the request, extracts the portion 310A of the address block 310 from the volatile memory. Further, in some embodiments (FIG. 4), the address block 310 includes 128 bytes, and the portion 310A of the address block 310 includes 64 bytes.

In some embodiments (FIG. 4), the address block 310 includes 128 bytes and corresponds to 31 physical addresses 306, and each physical address has 33 bits.

In some embodiments, the address block 310 consists of a plurality of non-overlapping portions (e.g., 310A and 310B), and each portion of the address block 310 includes a respective word choice configured to provide the supplemental word 308S having bits to be combined with remaining address words 308A in the respective portion of the address block 310. The remaining address words 308A may be complemental to the supplemental word 308S in the respective portion of the address block 310. Further, in some embodiments, for each non-overlapping portion, the respective word choice includes a first set of bits 402 that are supplemental to the remaining address words 308A in the respective portion and a second set of leftover bits (e.g., 306R1 and 306R2). The electronic device consolidates the second set of leftover bits 306R1 and 306R2 of each of the plurality of non-overlapping portions to provide a remaining physical address 306R. Further, in some embodiments, the electronic device includes a memory controller 202 and a volatile memory (e.g., cache 212A. DRAM 212B), and the volatile memory stores an L2P AIT including the address block 310. The memory controller 202 obtains a request associated with the remaining physical address 306R, and in response to the request, extracts the plurality of portions (e.g., 310A and 310B in FIGS. 4 and 5) of the address block 310 from the volatile memory (e.g., cache 212A. DRAM 212B).

Additionally, in some embodiments, for a first portion 310A of the address block 310, each of the remaining address words 308A (e.g., 308-1) has a respective word location (e.g., 312-1) and corresponds to a respective bit (402-1) in the supplemental word 308S1, and a respective bit location of the respective bit in the supplemental word 308S1 is associated with the respective word location of the respective remaining address word in first portion 310A of the address block 310 according to a predefined relationship. Additionally, in some embodiments, the predefined relationship applies to all of the remaining address words 308A associated with physical addresses 306A in the first portion 310A of the address block 310. In some embodiments, the predefined relationship applies to all of the remaining address words 308 associated with physical addresses 306A in the address block 310 including both of the portions 310A and 310B.

In some embodiments (FIG. 4), the address block 310 includes 128 bytes and corresponds to 31 physical addresses 306, and each physical address 306 has 33 bits. The address block 310 is divided into two portions 310A and 310B, each of which includes 64 successive bytes, and each portion 310A or 310B stores 15 complete physical addresses 306. Each portion 310A or 310B has a single supplemental word 308S, and supplemental words 308S of the two portions 310A and 310B provide a last physical address 306R jointly.

In some embodiments (FIG. 5), the address block 310 includes 64 bytes and corresponds to 15 physical addresses 306, and each physical address 306 has 34 bits. The address block 310 is divided into two portions 310A and 310B, each of which includes 32 successive bytes, and each portion 310A or 310B stores 7 complete physical addresses 306. Each portion 310A or 310B has a single supplemental word 308S, and supplemental words 308S of the two portions 310A and 310B provide a last physical address 306R jointly.

Memory is also used to store instructions and data associated with the method 600, and includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing method 600.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a". "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes." "including." "comprises." and/or "comprising." when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first." "second." etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that." depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected." depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method implemented at an electronic device, the method comprising:
 identifying an address block including a plurality of physical addresses that corresponds to an ordered sequence of logical addresses, each logical address corresponding to a distinct physical address;
 determining that a first physical address is associated with a first word having a first word location in the address block;

extracting the first word from the first word location in the address block;
 based on the first word location, determining a first bit location in a supplemental word that is distinct from the first word, the first bit location in the supplemental word associated with the first word location in the address block;
 extracting at least a first bit from the first bit location of the supplemental word; and
 generating the first physical address based on the first word and the first bit;
 wherein the address block includes a plurality of non-overlapping portions, and each respective portion of the address block includes a respective word choice configured to provide the supplemental word having bits to be combined with remaining address words in the respective portion of the address block.

2. The method of claim 1, wherein the first bit location is measured successively from a start bit of the supplemental word and represented by a first integer number, and the first word location is measured successively from a start word of the address block and represented by a second integer number, the first integer number being determined from the second integer number.

3. The method of claim 1, further comprising:
 selecting the supplemental word from a plurality of word choices located at a plurality of distinct known word locations in the address block.

4. The method of claim 3, wherein the plurality of word choices include two word choices located at two distinct word locations in the address block, wherein selecting the supplemental word further comprises:
 applying a bitwise logic operation on a set of first predefined bits of a binary representation of the first word location to determine a set of first corresponding bits of a binary representation of one of the two distinct word locations.

5. The method of claim 4, wherein bit locations of each first predefined bit of the binary representation of the first word location and a corresponding first bit of the binary representation of one of the two distinct word locations matches one another.

6. The method of claim 4, wherein the bitwise logic operation includes an OR operation or an AND operation.

7. The method of claim 4, wherein binary representations of the two distinct word locations of the two word choices differ by one bit.

8. The method of claim 3, wherein the plurality of word choices include two word choices located at two distinct word locations in the address block, wherein selecting the supplemental word further comprises:
 extracting a second predefined bit of a binary representation of the first word location; and
 determining a corresponding second bit of a binary representation of a supplemental word location of the supplemental word based on the second predefined bit of the binary representation of the first word location, wherein the supplemental word is selected from the two word choices based on the corresponding second bit of the supplemental word location.

9. The method of claim 1, wherein:
 the electronic device includes a memory controller and a volatile memory, and the volatile memory stores a logical-to-physical (L2P) address indirection table (AIT) including the address block;

a portion of the address block includes both of the first word and the supplemental word, the portion less than all of the address block; and the method further comprising, at the memory controller:

obtaining a request for the first physical address; and in response to the request, extracting the portion of the address block from the volatile memory.

10. The method of claim 9, wherein the address block includes 128 bytes, and the portion of the address block includes 64 bytes.

11. The method of claim 1, wherein the address block includes 128 bytes and corresponds to 31 physical addresses, and each physical address has 33 bits.

12. An electronic device, comprising:

one or more processors; and memory storing one or more programs for execution by the one or more processors, the one or more programs including instructions for:

identifying an address block including a plurality of physical addresses that corresponds to an ordered sequence of logical addresses, each logical address corresponding to a distinct physical address;

determining that a first physical address is associated with a first word having a first word location in the address block;

extracting the first word from the first word location in the address block;

based on the first word location, determining a first bit location in a supplemental word that is distinct from the first word, the first bit location in the supplemental word being determined from the first word location in the address block;

extracting at least a first bit from the first bit location of the supplemental word; and generating the first physical address based on the first word and the first bit;

wherein the address block includes a plurality of non-overlapping portions, and each respective portion of the address block includes a respective word choice configured to provide the supplemental word having bits to be combined with remaining address words in the respective portion of the address block.

13. The electronic device of claim 12, wherein for each non-overlapping portion, the respective word choice includes a first set of bits that are supplemental to the remaining address words in the respective portion and a second set of leftover bits, and wherein the one or more programs further comprise instructions for:

consolidating the second set of leftover bits of each of the plurality of non-overlapping portions to provide a remaining physical address.

14. The electronic device of claim 13, wherein:

the electronic device includes a memory controller and a volatile memory, and the volatile memory stores an L2P AIT including the address block; and the one or more programs further comprise instructions for, at the memory controller:

obtaining a request associated with the remaining physical address; and in response to the request, extracting the plurality of non-overlapping portions of the address block from the volatile memory.

15. The electronic device of claim 12, wherein, for a first portion of the address block:

each of the remaining address words has a respective word location and corresponds to a respective bit in the supplemental word, and a respective bit location of the respective bit in the supplemental word is associated with the respective word location of the respective remaining address word in first portion of the address block according to a predefined relationship.

16. The electronic device of claim 15, wherein the predefined relationship applies to all of the remaining address words in the first portion of the address block.

17. The electronic device of claim 12, wherein:

the address block includes 128 bytes and corresponds to 31 physical addresses, and each physical address has 33 bits;

the address block is divided to two portions each of which includes 64 successive bytes, and each portion stores 15 complete physical addresses; and each portion has a single supplemental word, and supplemental words of the two portions provide a last physical address jointly.

18. The electronic device of claim 12, wherein:

the address block includes 64 bytes and corresponds to 15 physical addresses, and each physical address has 34 bits;

the address block is divided to two portions each of which includes 32 successive bytes, and each portion stores 7 complete physical addresses; and each portion has a single supplemental word, and supplemental words of the two portions provide a last physical address jointly.

19. The electronic device of claim 12, wherein the one or more programs further comprise instructions for:

selecting the supplemental word from a plurality of word choices located at a plurality of distinct known word locations in the address block.

20. A non-transitory computer-readable storage medium storing one or more programs for execution by one or more processors, the one or more programs comprising instructions for:

identifying an address block including a plurality of physical addresses that corresponds to an ordered sequence of logical addresses, each logical address corresponding to a distinct physical address;

determining that a first physical address is associated with a first word having a first word location in the address block;

extracting the first word from the first word location in the address block;

based on the first word location, determining a first bit location in a supplemental word that is distinct from the first word, the first bit location in the supplemental word being determined from the first word location in the address block;

extracting at least a first bit from the first bit location of the supplemental word; and generating the first physical address based on the first word and the first bit;

wherein the address block includes a plurality of non-overlapping portions, and each respective portion of the address block includes a respective word choice configured to provide the supplemental word having bits to be combined with remaining address words in the respective portion of the address block.

* * * * *